United States Patent [19]

Carpenter et al.

[11] Patent Number: 5,563,974
[45] Date of Patent: Oct. 8, 1996

[54] TOOL FOR CONNECTOR WITH CLEAVED OPTICAL FIBER

[75] Inventors: James B. Carpenter, Austin; Joseph A. Paparella, Round Rock, both of Tex.

[73] Assignee: Minnesota Mining and Manufacturing Company, St. Paul, Minn.

[21] Appl. No.: 366,993

[22] Filed: Dec. 30, 1994

[51] Int. Cl.$^6$ .................................................. G02B 6/36
[52] U.S. Cl. .............................. 385/85; 385/78; 385/139
[58] Field of Search ................................. 385/85, 80, 78, 385/139

[56] References Cited

U.S. PATENT DOCUMENTS

| | | | |
|---|---|---|---|
| 4,865,412 | 9/1989 | Patterson | 350/96.21 |
| 4,892,378 | 1/1990 | Zajac et al. | 385/85 |
| 4,979,792 | 12/1990 | Weber et al. | 350/96.20 |
| 4,986,626 | 1/1991 | Bossard | 350/96.20 |
| 5,040,867 | 8/1991 | de Jong et al. | 385/60 |
| 5,044,721 | 9/1991 | Nakamura | 385/53 |
| 5,080,460 | 1/1992 | Erdman et al. | 385/81 |
| 5,088,804 | 2/1992 | Grinderslev | 385/81 |
| 5,102,211 | 4/1992 | Slaney et al. | 385/81 |
| 5,113,474 | 5/1992 | Slaney et al. | 385/136 |
| 5,131,063 | 7/1992 | Monroe et al. | 385/78 |
| 5,140,662 | 8/1992 | Kumar | 385/87 |
| 5,142,598 | 8/1992 | Tabone | 385/78 |
| 5,146,525 | 9/1992 | Tabone | 385/78 |
| 5,208,887 | 5/1993 | Grinderslev | 385/81 |
| 5,216,734 | 6/1993 | Grinderslev | 385/60 |
| 5,241,613 | 8/1993 | Li et al. | 385/78 |
| 5,337,390 | 8/1994 | Henson et al. | 385/81 |
| 5,408,558 | 4/1995 | Fan | 385/80 |
| 5,414,790 | 5/1995 | Lee et al. | 385/139 |

FOREIGN PATENT DOCUMENTS

486189A2  5/1992  European Pat. Off. .......... G02B 6/38

Primary Examiner—John D. Lee
Assistant Examiner—Phan T. H. Palmer
Attorney, Agent, or Firm—Gary L. Griswold; Walter N. Kirn; Jack V. Musgrove

[57] ABSTRACT

A tool adapted for use in cleaving an optical fiber installed in a ferrule connector, which can also act as an acutation cap for the connector. The tool comprises a body having a cavity for receiving the ferrule of the connector, and a floor at the extreme end of the cavity which contacts the ferrule end face when the ferrule is fully inserted into the cavity, there further being a hole in this floor, positioned to receive a portion of the optical fiber which has been inserted in the ferrule and protrudes from the end face. When the fiber passes through the hole and beyond the floor, it may be scored and subsequently cleaved. The thickness of the floor is controlled to precisely locate the score with respect to the ferrule end face, to present an optimal length of fiber stub for polishing. Scoring the fiber in this manner allows the buffered portion of the fiber to be secured to the strain relief element of the connector, and any clamping element of the connector secured, prior to scoring and cleaving.

2 Claims, 2 Drawing Sheets

5,563,974

TOOL FOR CONNECTOR WITH CLEAVED OPTICAL FIBER

BACKGROUND OF THE INVENTION

1. Field of the Invention

The present invention generally relates to devices for interconnecting optical fibers, such as are used in telecommunications, and more particularly to an actuation cap for a fiber optic connector which also facilitates cleaving of the optical fiber.

2. Description of the Prior Art

Optical fibers have become the preferred medium for telecommunications but, as with copper wire, it is still necessary to interconnect optical fibers, for example, during installation or repair, or for connecting them to active optical devices. The present invention is directed to a tool for such a fiber optic connector. In this regard, a fiber optic "connector" often refers to a device which allows repeatable engagement and disengagement of the cable, while a "splice" typically refers to a device which is used for the permanent attachment of two cable ends. These terms should not, however, be construed in a limiting sense as used herein since the present invention is applicable to the installation of all classes of fiber optic interconnection devices.

The prior art includes ferrule-type fiber optic connectors having a cylindrical member (the ferrule) usually made of a ceramic material, zirconia, or alumina, with a central bore for receiving the fiber. The ferrule is held by a collar or backbone which in turn may be surrounded by one of many different coupling shells. For example, a coupling shell having a bayonet-style latching mechanism is commonly referred to as an "ST" connector. An alternative shell having ramped surfaces which latch onto lever arms of a receptacle is known as an "SC" connector. Yet another shell having a simple threaded nut is known as an "FC" connector. There are many conventional techniques for securing an optical fiber in ferrule connectors. See the discussion concerning prior art in U.S. patent application Ser. No. 08/149,641 now U.S. Pat. No. 5,414,790.

The '641 application teaches the use of a combined actuation tool and dust cap which precisely positions the fiber end face with respect to the ferrule end face, more specifically, with the fiber end face extending slightly outward from the ferrule end face. This positioning of the ferrule and fiber is very useful in "cleave and crimp" operations wherein the fiber is cleaved prior to insertion into the connector, and then the cable jacket or strengthening strands are secured to the connector body, with very little, if any, final polishing of the fiber tip. The 641' tool/cap, which is probably the closest prior art, is shown in FIG. 1, as attached to a CRIMPLOK fiber optic connector, designed for field installation of the fiber (CRIMPLOK is a trademark of Minnesota Mining and Manufacturing Co., assignee of the present invention). The depicted connector uses bayonet-style latching with a lug 1 formed on the ferrule collar 2. The ferrule 3 extends into a cavity 4 of the tool body 5, and this cavity has at its bottom a smaller diameter portion 6 which allows the precise location of the fiber end. A button 7 on an arm 8 of the tool is used to actuate the clamping element 9 in the connector.

This tool requires the fiber end to be cleaved prior to insertion into the connector and ferrule. If the fiber end face is damaged after cleaving, i.e., during insertion into the connector, then the cleaving operation must be repeated. An improper cleave can even cause the fiber to break inside the ferrule. Since this operation also requires that the fiber be cleaved at a specific distance from the end of the buffer coating, this coating may have to be stripped further. In this design, the fiber must further be secured to the collar (via clamping element 9) prior to securing the cable jacket with any strain relief crimp. If the fiber is not first clamped, then it may move backwards in the connector body due to forces exerted by the crimping ring on the buffer coating, and the fiber end face will consequently not be positioned at the bottom of smaller diameter portion 6. Conversely, however, this same phenomenon results in tensile stress in the fiber between the clamping element and the strain relief crimp. Such stress may cause the fiber to break, or still to be pulled back slightly in spite of the clamping element. Moreover, these conditions may occur during connector installation, or at an indefinite point in time during use.

If the cleave is poor quality, hackled edges at the end of the fiber might not leave enough fiber protruding from the end of the ferrule to perform a proper polish. Compensating for this possibility by making the smaller diameter portion 6 deeper leaves a greater length of protruding fiber which is more easily broken by transverse forces generated during polishing. This tool thus requires a quality cleaver and a skilled technician, adding expense to the overall process. It would, therefore, be desirable to devise a tool which allows the precise positioning of the end of an optical fiber with respect to the ferrule end face, and allows cleaving of the fiber after it has been inserted into the connector and ferrule, and which additionally allows a strain relief crimp to be applied prior to securing the fiber in the ferrule, eliminating the possibility of tensile stresses in the fiber and end face location errors. It would be further advantageous if the tool eliminated the need for a quality cleaver.

SUMMARY OF THE INVENTION

The present invention provides a tool used in cleaving an optical fiber installed in a ferrule connector, generally comprising a body having a cavity therein for receiving a ferrule in the connector, such that when the ferrule is placed in the cavity, the optical fiber may be inserted through a bore in the ferrule and protrude from an end face of the ferrule, and means located on the body for positioning the tip of a cutting tool or scribe at a precise location along the portion of the fiber protruding from the ferrule end face. This positioning means includes a floor along a portion of the cavity, which contacts the ferrule end face when the ferrule is fully inserted in said cavity, and a hole passing through the floor and positioned to receive the protruding portion of the optical fiber. The thickness of the floor is controlled to determine the length of the fiber stub which results after the fiber is cleaved along a nick or score formed adjacent the hole.

In one embodiment, the floor has a flat surface opposite the cavity, completely surrounding the hole, so the scribe can approach the fiber from any direction. In another embodiment, the floor has lower and upper surfaces formed thereon, opposite the cavity, defining a shelf for supporting the protruding portion of the optical fiber, the lower and upper surfaces and shelf forming a straight groove passing over the hole, so that the scribe location is maintained during scribe movement. The lower surface may have a slot therein, perpendicular to the shelf and aligned with the hole, to allow cleaving by pushing the optical fiber into the slot.

The body of the tool, which can also function as an actuation cap, preferably has means for removably attaching the tool to the connector, such as a slot formed in the tool body for receiving a lug on the ferrule collar of an ST connector plug, or a pair of latch arms for catching the plug body of an SC connector. In the embodiment designed for use with a connector having a clamping element for securing a portion of the fiber proximate the ferrule, the tool additionally includes means for actuating the clamping element after the connector is attached to the tool and while the optical fiber is protruding from the ferrule end face. More specifically, a tool according to the present invention, adapted for use with a CRIMPLOK connector, has a cantilever arm with a button for pushing the clamping element in the connector. The tool body, floor, arm, etc., may be integrally formed from an injection molded polymer.

BRIEF DESCRIPTION OF THE DRAWINGS

The invention will best be understood by reference to the accompanying drawings, wherein.

DESCRIPTION OF THE PREFERRED EMBODIMENT

Figure 1:
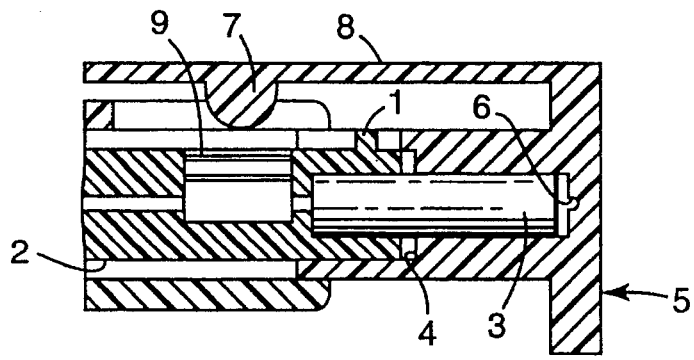
FIG. 1 is a sectional view of a prior art tool used to secure an optical fiber to a ferrule-type, fiber optic connector, and precisely position the end of the fiber with respect to the ferrule end face.
Figure 2:
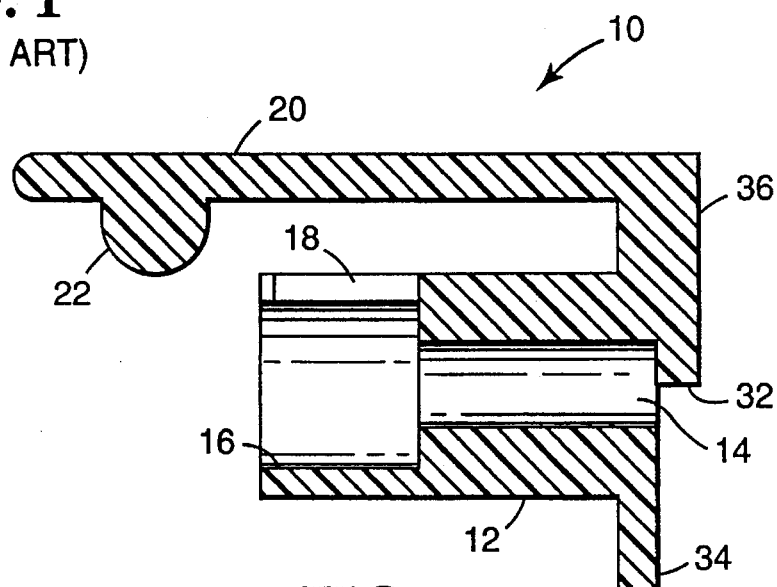
FIG. 2 is a sectional view of one embodiment of the tool of the present invention, taken along lines A—A of FIG. 4.
Figure 3:
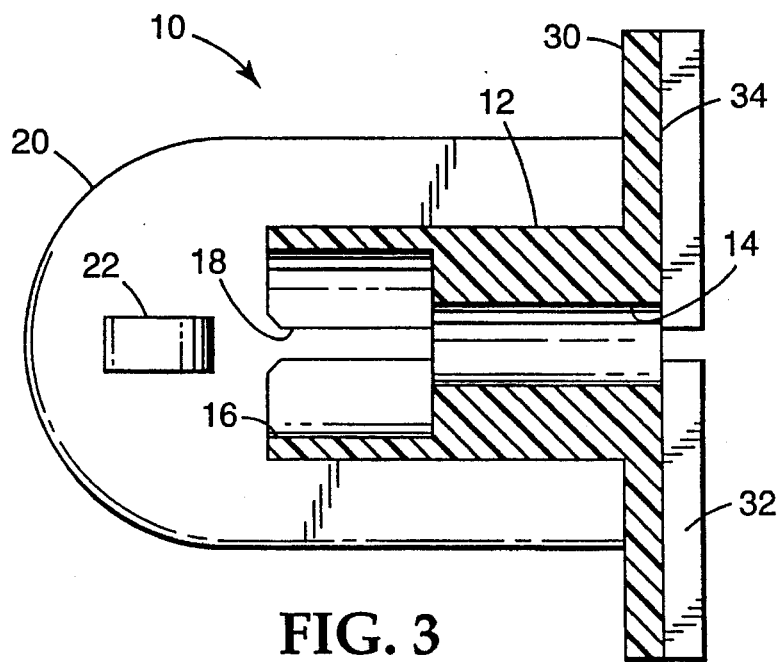
FIG. 3 is a sectional view of the tool of FIG. 2, taken along lines B—B of FIG. 4.

With reference now to the figures, and in particular with reference to FIGS. 2 and 3, there is depicted one embodiment 10 of the tool of the present invention, adapted for use with a CRIMPLOK fiber optic connector. Details of this connector are disclosed in U.S. Pat. No. 5,337,390. While the cleaving ability imparted by the present invention is particularly useful with such a connector, those skilled in the art will appreciate that the tool may be adapted for other styles of ferrule connectors.

Certain features of tool 10 are similar to those in the tool of U.S. patent application Ser. No. 08/149,641 now U.S. Pat. No. 5,414,790, which is hereby incorporated. Tool 10, which may also function as an actuation cap (and be pre-installed on a connector at the factory), is generally comprised of a main portion, or tool body 12, having a cavity therein for receiving the ferrule of an ST connector. The cavity includes a first diameter portion 14 whose inner diameter is just slightly larger than the outer diameter of the ferrule, providing a precise fit when the connector is attached to body 12. A second, larger diameter portion 16 is provided for the ferrule collar and imparts a snug fit between the collar and the body. A slot 18 formed in the body, along portion 16, accepts the lug on the ferrule collar. Body 12 has an arm 20 attached thereto, with a button 22 for actuating the clamping element in the connector. Arm 20 is preferably integrally formed with body 12, front an injection moldable polymer, such as polyether sulfone with 20% glass loading.

Figure 4:
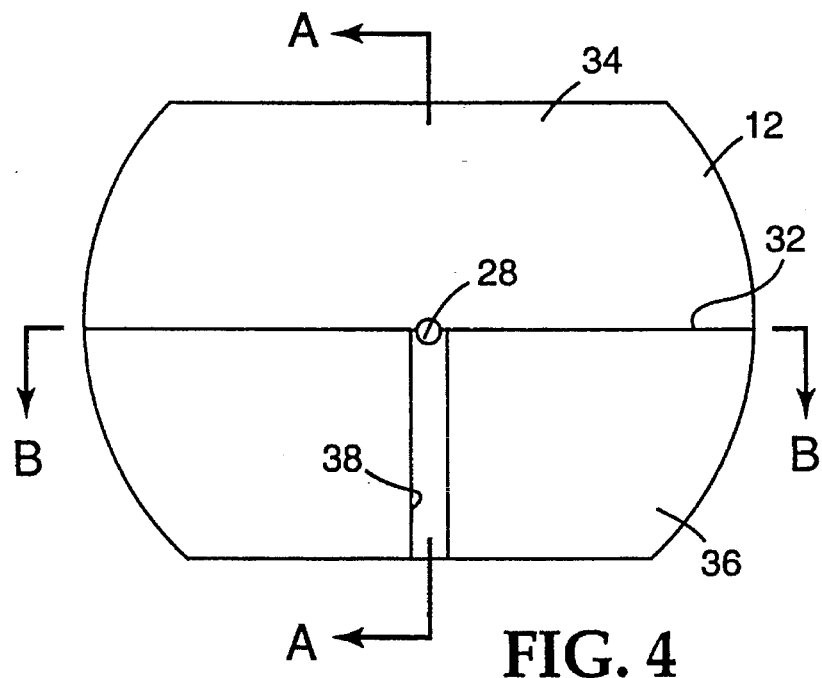
FIG. 4 is a bottom plan view of the tool of FIGS. 2 and 3.
Figure 5:
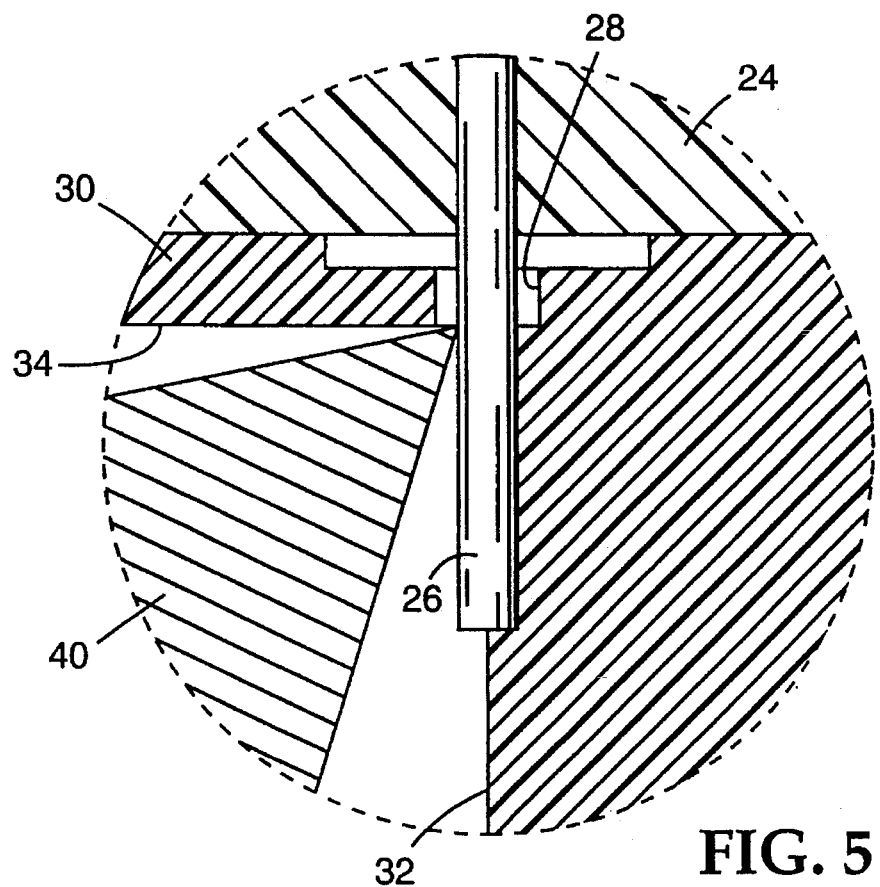
FIG. 5 is a detail view of the ferrule and fiber ends, located in the tool of FIGS. 2–4, during the cleaving operation.

FIG. 5 is a detail view of body 12, along the same section line as FIG. 2, but also showing the insertion of the ferrule 24 and fiber 26 which passes through a bore in ferrule 24. Fiber 26 passes through a hole 28 in the floor 30 of body 12. In this embodiment, a shelf 32 is molded onto floor 30, having a surface which is generally perpendicular to floor 30 and parallel with ferrule 24 and fiber 26. As further seen in FIG. 4, shelf 32 is created by molding a step in the upper surface 34 of the tool, forming another, lower surface 36. The surface of shelf 32 is located on the centerline of hole 28. A slot 38 may be formed in lower surface 36 to allow bending of the terminal portion of fiber 26, the slot being perpendicular to shelf 32 and aligned with hole 28. The 90° V-groove formed between shelf 32 and lower surface 36 may be used for guiding a (carbide-tipped) cutting scribe 40 which, when moved either from left to right or right to left in FIG. 4, results in nicking of the fiber surface planar to surface 34. Tool 10 thus first acts as a cleaving template to locate the tip of the scribe tool, and secondly maintains the scribe location during scribe movement.

By providing for cleaving of the fiber after it has been inserted into the ferrule, the strain relief mechanism may be secured prior to clamping of the fiber. Although this may still result in some movement of the fiber, cleaving is performed after the strain relief is secured (and the clamping mechanism is actuated), so this does not affect the final position of the cleaved end face. Accordingly, the potential damage discussed in the Description of the Prior Art, resulting from stress on the fiber between the strain relief crimp and the clamping element, is eliminated. After the fiber is cleaved, the technician bends the fiber away from the nick in the fiber (by pushing it into slot 38), causing the fiber to break or cleave at the point the nick was made. The cleaved fiber end face is positioned at a precise location with respect to the ferrule end face due the controlled thickness of floor 30. This short stub is then polished down to the ferrule end face. The floor thickness (stub length) is preferably about 0.18 mm (0.007"). Hole 28 preferably has a diameter of about 0.25 mm (0.010"). Slot 38 is preferably about 0.81 mm (0.032") wide, and its depth corresponds to the plane of surface 34.

In an alternative embodiment of the present invention, slot 38 is omitted, i.e., lower surface 36 is completely flat. While this prevents the fiber from being bent opposite the nick point, it still allows the fiber to break at the nick point, and provides support to the fiber during the scribe operation. In another embodiment, shelf 32 and surface 36 are also omitted, i.e., there is only a single flat surface across the bottom of the tool rather than lower and upper surfaces. This allows the fiber to be scribed from any direction, using only the flat surface to guide the scribe. In this embodiment, the tool may also be used as a polishing jig for preliminary polishing.

Although the invention has been described with reference to specific embodiments, this description is not meant to be construed in a limiting sense. Various modifications of the disclosed embodiment, as well as alternative embodiments of the invention, will become apparent to persons skilled in the art upon reference to the description of the invention. For example, the tool may be adapted for use with SC connectors by providing latch arms on the tool body in a manner similar to that shown in the '641 application, or modified to receive other types such as FC connectors. It is therefore contemplated that such modifications can be made without departing from the spirit or scope of the present invention as defined in the appended claims.

We claim:

1. An article used in cleaving an optical fiber installed in a ferrule connector, the article comprising a body having:

a cavity for receiving a ferrule in the connector, said cavity having a floor which contacts the ferrule end face when the ferrule is fully inserted in said cavity;

a hole passing completely through said floor and positioned to receive a portion of the optical fiber protruding from the ferrule end face when the ferrule is placed in said cavity, said floor having lower and upper surfaces formed thereon, opposite said cavity, defining a shelf for supporting the protruding portion of the optical fiber, said lower and upper surfaces and shelf forming a straight groove passing over said hole such that a scribing tool may be guided along said groove to nick the fiber at a point above the ferrule end face, and said upper surface having a slot therein, perpendicular to said shelf and aligned with said hole; and means for removably attaching said body to the connector.

2. The article of claim 1 wherein said connector has an element therein for securing a portion of the fiber proximate the ferrule by moving from an unactuated state to an actuated state, and further comprising means, attached to said body, for actuating the securing element when the optical fiber is protruding from the ferrule end face.

* * * * *